United States Patent [19]

Morita et al.

[11] Patent Number: 5,422,412

[45] Date of Patent: Jun. 6, 1995

[54] ORGANOPOLYSILOXANE AND METHOD FOR THE PREPARATION THEREOF

[75] Inventors: Yoshitsugu Morita; Ken Tanaka, both of Chiba, Japan

[73] Assignee: Dow Corning Toray Silicon Co., Ltd, Tokyo, Japan

[21] Appl. No.: 263,589

[22] Filed: Jun. 22, 1994

[30] Foreign Application Priority Data

Aug. 18, 1993 [JP] Japan ................................. 5-225164

[51] Int. Cl.$^6$ .............................................. C08G 77/08
[52] U.S. Cl. ........................................ 528/25; 528/15
[58] Field of Search .................................. 528/15, 25

[56] References Cited

U.S. PATENT DOCUMENTS

| | | | |
|---|---|---|---|
| 4,707,531 | 11/1987 | Shirahata | 528/12 |
| 4,946,921 | 8/1990 | Shirahata et al. | 528/39 |
| 5,248,751 | 9/1993 | Takahashi et al. | 524/265 |
| 5,283,309 | 2/1994 | Morita | 528/15 |
| 5,344,905 | 9/1994 | Morita | 528/27 |

FOREIGN PATENT DOCUMENTS

| | | |
|---|---|---|
| 345534 | 12/1989 | European Pat. Off. |
| 331409 | 11/1991 | Japan |
| 105758 | 5/1993 | Japan |

Primary Examiner—Melvyn I. Marquis
Attorney, Agent, or Firm—Alexander Weitz

[57] ABSTRACT

An organopolysiloxane suitable for modifying curable organic and silicone compositions is disclosed, said organopolysiloxane having the general formula

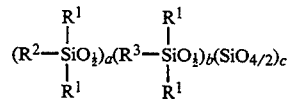

wherein each $R^1$ is a monovalent group independently selected from the group consisting of alkyl radicals having 1 to 5 carbon atoms and phenyl radical; $R^2$ is a monovalent group independently selected from the group consisting of hydrogen, alkyl radicals having 1 to 5 carbon atoms and phenyl radical; $R^3$ is selected from the group consisting of alkoxysilylalkyl groups and alkyl groups having at least 6 carbon atoms; a is zero or a positive number; b is a positive number; c is a positive number; a/c has a value of zero to <4; b/c has a value of 0.05 to 4; and (a+b)/c has a value of 0.2 to 4, with the proviso that said organopolysiloxane has in its molecule at least one said alkoxysilylalkyl group and at least one said alkyl group having at least 6 carbons.

16 Claims, No Drawings

ORGANOPOLYSILOXANE AND METHOD FOR THE PREPARATION THEREOF

FIELD OF THE INVENTION

The present invention relates to an organopolysiloxane and to a method for its preparation. More specifically, the invention relates to an organopolysiloxane that is composed of monofunctional siloxane units (M units) and tetrafunctional siloxane units (Q units) and that contains in each molecule at least 1 alkoxysilylalkyl group and at least 1 alkyl group having at least 6 carbons. The invention also relates to a method for the preparation of this organopolysiloxane.

BACKGROUND OF THE INVENTION

Among the various types of organopolysiloxanes already known in the art, MQ organopolysiloxane composed of the monofunctional siloxane unit (M unit) and tetrafunctional siloxane unit (Q unit) (refer to Japanese Patent Application Laid Open Number Sho 61-195129) is by virtue of its heat resistance used as a starting material for varnishes and pressure-sensitive adhesives. More recently, hydroxyphenyl-containing MQ organopolysiloxane has been taught by Japanese Patent Application Laid Open Number Hei 1-292036 and chloromethyl-containing MQ organopolysiloxane has been taught by Japanese Patent Application Laid Open Number Hei 2-153935. One of the present inventors has also already proposed MQ organopolysiloxane that contains epoxy-functional organic and alkoxysilylalkyl groups (Japanese Patent Application Laid Open Number Hei 5-105758) and MQ organopolysiloxane that contains epoxy-functional organic groups and diorganopolysiloxane residues (Japanese Patent Application Number Hei 3-331409). However, MQ organopolysiloxane having alkoxysilylalkyl and $C \geq 6$ alkyl groups on the monofunctional siloxane unit (M unit) silicon has heretofore been unknown.

SUMMARY OF THE INVENTION

The present invention takes as its object the introduction of organopolysiloxane that is composed of the monofunctional siloxane unit (M unit) and tetrafunctional siloxane unit (Q unit) and that contains in each molecule at least 1 alkoxysilylalkyl group and at least 1 alkyl group having at least 6 carbons. A further object of the present invention is the introduction of a method for the preparation of this organopolysiloxane.

DETAILED DESCRIPTION OF THE INVENTION

The organopolysiloxane in accordance with the present invention has the general formula given below and contains in each molecule at least 1 alkoxysilylalkyl group and at least 1 alkyl group having at least 6 carbons

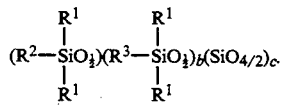

In the above formula, $R^1$ is the phenyl group or a lower alkyl group having 5 or fewer carbons. These lower alkyl groups are specifically exemplified by methyl, ethyl, propyl, butyl, and pentyl. $R^2$ in the preceding general formula ms a group selected from hydrogen atom, phenyl group, and lower alkyl groups having 5 or fewer carbons, such as methyl, ethyl, propyl, butyl, and pentyl. $R^3$ in the preceding general formula represents the alkoxysilylalkyl or $C \geq 6$ alkyl groups (i.e., alkyl groups having at least 6 carbon atoms). The alkoxysilylalkyl groups encompassed by $R^3$ are specifically exemplified by trimethoxysilylethyl, trimethoxysilylpropyl, trimethoxysilylbutyl, trimethoxysilylpentyl, triethoxysilylethyl, triethoxysilylpropyl, triethoxysilylbutyl, methyldimethoxysilylethyl, methyldimethoxysilylpropyl, dimethylmethoxysilylethyl, and dimethylmethoxysilylpropyl. The $C \geq 6$ alkyl groups encompassed by $R^3$ are specifically exemplified by hexyl, heptyl, octyl, nonyl, decyl, undecyl, dodecyl, tridecyl, tetradecyl, pentadecyl, hexadecyl, heptadecyl, and octadecyl. Preferred here are n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl. The alkyl group comprising $R^3$ in the organopolysiloxane of the present invention must contain at least 6 carbons, but the upper limit on the number of carbons is not specifically restricted. However, when the invention organopolysiloxane is to be blended into a curable organic resin, the preferred range for the number of carbons in the alkyl group comprising $R^3$ is 6 to 30 because this yields good compatibility with organic resins and good flexibility on the part of the final cured resin.

The subscript a in the preceding formula is zero or a positive number, and it represents the number of monofunctional siloxane units (M unit) that contain neither alkoxysilylalkyl nor $C \geq 6$ alkyl. The subscript b in the preceding formula is a positive number, and it represents the number of monofunctional siloxane units (M unit) that carry an alkoxysilylalkyl group or $C \geq 6$ alkyl group. The subscript c is a positive number that represents the number of tetrafunctional siloxane units (Q unit). The ratios among these subscripts are as follows: $a/c = 0$ to $<4$, $b/c = 0.05$ to $4$, and $(a+b)/c = 0.2$ to $4$. The bases for these ratios are as follows: (i) no more than 4M units can be present per Q unit; (ii) the presence of less than 0.2M units per Q unit results in a reduced compatibility with curable organic resins; and (iii) there must be present per Q unit at least 0.05 monofunctional siloxane units (M unit) that carry the alkoxysilylalkyl group or $C \geq 6$ alkyl group in order for the invention organopolysiloxane to exhibit good miscibility with, and a good stress-relaxation effect on, organic resins.

The organopolysiloxane of the present invention is a liquid or solid at room temperature. While its weight average molecular weight is not specifically restricted, this parameter preferably falls in the range of 500 to 500,000 because this affords good miscibility with organic resins.

In the preparative method of the present invention, the hydrosilylation-reaction catalyst comprising component (A) is a catalyst for the addition reaction of the silicon-bonded hydrogen atoms in component (B) across the aliphatically unsaturated bonds in components (C) and (D), as described infra.

The hydrosilylation-reaction catalyst of component (A) comprises those compounds generally used as hydrosilylation-reaction catalysts, and no specific restrictions otherwise apply to this component. The hydrosilylation-reaction catalyst of component (A) is specifically exemplified by platinum, rhodium, and palladium compounds, but platinum compounds are preferred. Preferred platinum compounds are specifically exemplified by chloroplatinic acid, alcohol solutions of chloroplatinic acid, complexes between platinum and aliphatically unsaturated hydrocarbon compounds, platinum-vinylsiloxane complexes, platinum black, and platinum on active carbon. The addition of component (A) in the preparative method of the present invention is not specifically restricted as long as a catalytic quantity is added. When, for example, a platinum compound is used as component (A), it is preferably added in a quantity that provides 0.01 to 500 ppm as platinum metal atoms in component (A) relative to the organopolysiloxane comprising component (B).

The organopolysiloxane comprising component (B) is the principal starting material in the preparative method of the present invention, and it is expressed by the following general formula

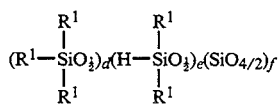

R1 in the preceding formula is the phenyl group or a lower alkyl group having 5 or fewer carbons, the latter being specifically exemplified by methyl, ethyl, propyl, butyl, and pentyl.

The subscript d in the preceding formula is zero or a positive number, and it represents the number of monofunctional siloxane units (M units) that do not carry silicon-bonded hydrogen. The subscript e is a positive number that represents the number of monofunctional siloxane units (M units) that carry silicon-bonded hydrogen. The subscript f is a positive number that represents the number of tetrafunctional siloxane units (Q units). The ratios among these subscripts are as follows: $d/f=0$ to $<4$, $e/f=0.05$ to 4, and $(d+e)/f=0.2$ to 4. The bases for these ratios are as follows: (i) no more than 4M units can be present per Q unit; (ii) there must be present per Q unit at least 0.05 SiH-containing monofunctional siloxane units (M units) in order for the invention organopolysiloxane (post-introduction of the alkoxysilylalkyl and $C_{\geq 6}$ alkyl groups) to exhibit good miscibility with organic resins.

Component (B) can be prepared by well-known methods. Preparative methods for component (B) are specifically exemplified as follows: (i) cohydrolysis of tetrahalosilane with monohalosilane, (ii) cohydrolysis of tetraalkoxysilane with monoalkoxysilane, and (iii) hydrolysis of tetraalkoxysilane and tetraorganodisiloxane followed by a re-equilibration polymerization reaction. The method in Japanese Patent Application Laid Open Number Sho 61-195129 is particularly preferred. This method consists of stirring organosilicon compound selected from hexaorganodisiloxane, tetraorganodisiloxane, triorganohalosilane, and diorganohalosilane in aqueous hydrochloric acid and dripping tetraalkoxysilane into this system.

The alkoxysilylalkene comprising component (C) is the component that introduces the alkoxysilylalkyl group into the invention organopolysiloxane. Component (C) is specifically exemplified by trimethoxyvinylsilane, trimethoxyallylsilane, trimethoxybutenylsilane, trimethoxypentenylsilane, triethoxyvinylsilane, triethoxyallylsilane, methyldimethoxyvinylsilane, methyldimethoxyallylsilane, methyldimethoxybutenylsilane, methyldiethoxyvinylsilane, methyldiethoxyallylsilane, dimethylmethoxyvinylsilane, dimethylmethoxyallylsilane, triethoxyvinylsilane, and methyldiethoxyvinylsilane.

The $C_{\geq 6}$ alkene comprising component (D) is the component that introduces the $C \geq 6$ alkyl group into the organopolysiloxane in accordance with the present invention. The preparative method of the present invention requires that component (D) contain at least 6 carbons. While the upper limit on the number of carbons is not specifically restricted, component (D) preferably contains 6 to 30 carbons because this affords good reactivity with component (B) as well as a good miscibility between the final organopolysiloxane product and curable organic resins. The position of the carbon-carbon double bond in component (D) is also not specifically restricted, but the preferred position is the end of the molecular chain. Component (D) is specifically exemplified by hexene, heptene, octene, nonene, decene, undecene, dodecene, tridecene, tetradecene, pentadecene, hexadecene, heptadecene, and octadecene. Preferred as component (D) are 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, and 1-octadecene Neither the quantity of addition of component (C) nor the quantity of addition of component (D) is specifically restricted in the preparative method of the present invention. However, when the removal of unreacted component (D) is problematic, component (D) is then preferably added in a quantity that will provide less than 1 alkenyl group in component (D) per silicon-bonded hydrogen in component (B). The organopolysiloxane product in accordance with the present invention will contain silicon-bonded hydrogen plus alkoxysilylalkyl and $C \geq 6$ alkyl groups when in the preparative method of the present invention components (C) and (D) together provide less than 1 aliphatically unsaturated bond per silicon-bonded hydrogen in component (B). When components (C) and (D) together provide . 1 aliphatically unsaturated bond per silicon-bonded hydrogen in component (B), organopolysiloxane will be produced that contains alkoxysilylalkyl and $C_{\geq 6}$ alkyl groups but which is almost free of silicon-bonded hydrogen.

The reaction sequence is freely selectable in the preparative method of the present invention. Specific examples of the reaction sequence are as follows: (i) components (A) and (B) are first mixed and components (C) and (D) are then added to this system in order to synthesize organopolysiloxane that contains SiH plus alkoxysilylalkyl and $C \geq 6$ alkyl groups; or (ii) components (A) and (B) are first mixed, component (C) is then added to this system in order to synthesize organopolysiloxane that contains SiH and alkoxysilylalkyl, and component (D) is subsequently added to the system in order to synthesize organopolysiloxane that contains alkoxysilylalkyl and C.6 alkyl groups.

The reaction temperature is not specifically restricted in the preparative method of the present invention, but reaction temperatures in the range of 50° C. to 150° C. are preferred in order to rapidly bring the addition reaction to completion. In addition, organic solvent can be used in the preparative method of the present invention. Organic solvents usable for the present invention are specifically but nonexhaustively exemplified by aromatic solvents such as toluene, and xylene; aliphatic solvents such as hexane, heptane, and octane; and ketone solvents such as acetone, and methyl ethyl ketone.

The invention organopolysiloxane prepared as described above is obtained in the form of a reaction mixture, and it can be purified by distillation of unreacted component (C) or component (D) from the reaction mixture.

Since each molecule of the invention organopolysiloxane contains at least 1 alkoxysilylalkyl group and at least 1 C≧6 alkyl group, this organopolysiloxane is useful as an internal stress-relaxing agent or internal release agent for curable resin compositions based on imide resin, phenolic resin, epoxy resin, and so forth, and for thermoplastic resins such as acrylic resin, polyethylene resin, and so forth. Moreover, the invention organopolysiloxane can be used as an adhesion promoter for curable organic resin compositions and curable organopolysiloxane compositions. Finally, the invention organopolysiloxane can be expected to improve the adhesion between curable resin compositions and metals and also to exhibit the activity of a surfactant with the C≧6 alkyl group acting as hydrophobic group.

EXAMPLES

The invention will be explained in greater detail below through working examples. The viscosity values reported in the examples were measured at 25° C., and the development of the reactions in the examples was monitored by infrared spectrochemical analysis.

Example 1

Twenty-five weight parts tetrakis(dimethylsiloxy)silane having the formula

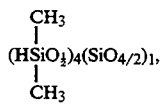

19.25 weight parts of 1-octadecene, and 100 weight parts of toluene were placed in a 1-liter four-neck flask equipped with a stirrer, reflux condenser, and thermometer. The moisture in the system was removed as the azeotrope by heating, and the system was then cooled under a nitrogen blanket. Five drops of a 2 weight % isopropanolic chloroplatinic acid solution were subsequently dripped into the system from a syringe followed by stirring for 1 hour while heating at 105° C. and subsequently cooling to room temperature. Fifty weight parts of allyltrimethoxysilane was then dripped into the system followed by stirring the system for 1 hour while heating at 110° C. Another 2 drops of the 2 weight % isopropanolic chloroplatinic acid solution were then dripped into the system, which was thereafter heated for 1 hour at 110° C. The toluene and unreacted substances were removed by heating under reduced pressure (120° C./2 mmHg) to afford 80.6 weight parts of product. This product was a transparent brown liquid having a viscosity of 24 centipoise. The characteristic absorption of the Si-H bond was almost completely absent from the product when measured by infrared spectrochemical analysis. The product had a refractive index of 1.4358. The gel permeation chromatogram of the product gave a weight-average molecular weight (Mw) of 1,530 (standard polystyrene basis) and a dispersity (Mw/Mn) of 1.07. Structural analysis of the product by 1H-nuclear magnetic resonance spectroscopy (NMR), 13C-NMR, and 29Si-NMR confirmed this product to be an organopolysiloxane mixture with the average formula given below.

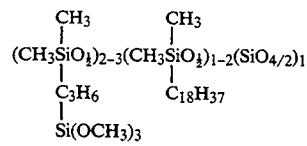

Example 2

One hundred weight parts of organopolysiloxane having the average formula

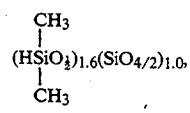

29.5 weight parts of 1-octadecene, 43.2 weight parts of vinyltrimethoxysilane, and 50.8 weight parts toluene were placed in a 1-liter four-neck flask equipped with a stirrer, reflux condenser, and thermometer. The moisture in the system was removed as the azeotrope by heating, and the system was then cooled under a nitrogen blanket. Five drops of a 2 weight % isopropanolic chloroplatinic acid solution were subsequently dripped into the system from a syringe. After heating while stirring at 120° C.-130° C. for 1 hour, 112.9 weight parts of vinyltrimethoxysilane was dripped in at 120° C.-125° C., and the system was again heated for 2 hours at 120° C - 125° C. The toluene and unreacted substances were removed by heating under reduced pressure (120° C./2 mmHg) to afford 257.1 weight parts of product. This product was a colorless transparent liquid with a viscosity of 96.5 centipoise. The characteristic absorption of the Si-H bond was not observed when the product was subjected to infrared spectrochemical analysis. The refractive index of the product was 1.4386. The gel permeation chromatogram of the product gave a weight-average molecular weight (Mw) of 2,580 (standard polystyrene basis) and a dispersity (Mw/Mn) of 1.14. Structural analysis of the product by 1H-NMR, 13C-NMR, and 29Si-NMR confirmed it to be an organopolysiloxane having the average formula

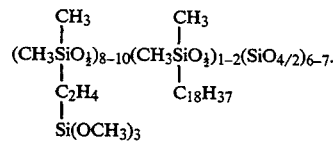

That which is claimed is:

1. An organopolysiloxane consisting essentially of the general formula

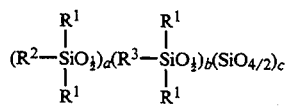

wherein each $R^1$ is a monovalent group independently selected from the group consisting of alkyl radicals having 1 to 5 carbon atoms and phenyl radical; $R^2$ is a monovalent group independently selected from the group consisting of hydrogen, alkyl radicals having 1 to 5 carbon atoms and phenyl radical; $R^3$ is selected from the group consisting of alkoxysilylalkyl groups and alkyl groups having at least 6 carbon atoms; a is zero or a positive number; b is a positive number; c is a positive number; a/c has a value of zero to <4; b/c has a value of 0.05 to 4; and (a+b)/c has a value of 0.2 to 4, with the proviso that said organopolysiloxane has in its molecule at least one said alkoxysilylalkyl group and at least one said alkyl group having at least 6 carbons.

2. The organopolysiloxane according to claim 1, wherein each $R^1$ is a methyl radical.

3. The organopolysiloxane according to claim 2, wherein said alkyl group having at least 6 carbon atoms is an alkyl group having 6 to 30 carbon atoms.

4. The organopolysiloxane according to claim 3, wherein said alkoxysilylalkyl group is selected from the group consisting of trimethoxysilylethyl, trimethoxysilylpropyl, trimethoxysilylbutyl, trimethoxysilylpentyl, triethoxysilylethyl, triethoxysilylpropyl, triethoxysilylbutyl, methyldimethoxysilylethyl, methyldimethoxysilylpropyl, dimethylmethoxysilylethyl, and dimethylmethoxysilylpropyl radicals.

5. The organopolysiloxane according to claim 4, wherein each $R^2$ is a methyl radical.

6. The organopolysiloxane according to claim 4, wherein each $R^2$ is hydrogen.

7. The organopolysiloxane according to claim 1, wherein a=0.

8. The organopolysiloxane according to claim 7, wherein each $R^1$ is a methyl radical.

9. The organopolysiloxane according to claim 8, wherein said alkyl group having at least 6 carbon atoms is an alkyl group having 6 to 30 carbon atoms.

10. The organopolysiloxane according to claim 9, wherein said alkoxysilylalkyl group is selected from the group consisting of trimethoxysilylethyl, trimethoxysilylpropyl, trimethoxysilylbutyl, trimethoxysilylpentyl, triethoxysilylethyl, triethoxysilylpropyl, triethoxysilylbutyl, methyldimethoxysilylethyl, methyldimethoxysilylpropyl, dimethylmethoxysilylethyl, and dimethylmethoxysilylpropyl radicals.

11. A method for the preparation of an organopolysiloxane comprising reacting in the presence of (A) a hydrosilylation-reaction catalyst: (B) an SiH-containing organopolysiloxane consisting essentially of the general formula

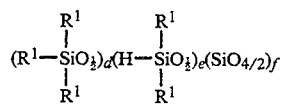

wherein each $R^1$ is a monovalent group independently selected from the group consisting of alkyl radicals having 1 to 5 carbon atoms and phenyl radical; d is zero or a positive number; e is a positive number; f is a positive number; d/f has a value of zero to <4; e/f has a value of 0.05 to 4; and (d+e)/f has a value of 0.2 to 4, (C) an alkoxysilylalkene, and (D) an alkene that contains at least 6 carbons.

12. The method according to claim 11, wherein d=0.

13. The method according to claim 12, wherein each $R^1$ is a methyl radical.

14. The method according to claim 11, wherein said alkene (D) has 6 to 30 carbon atoms.

15. The method according to claim 12, wherein said alkene (D) has 6 to 30 carbon atoms.

16. The method according to claim 13, wherein said alkene (D) has 6 to 30 carbon atoms.

* * * * *